Jan. 24, 1956
H. V. THOMPSON
2,733,201
CONDUCTIVITY CELL FOR DETERMINING
THE SALINITY OF SEA WATER
Filed July 24, 1952
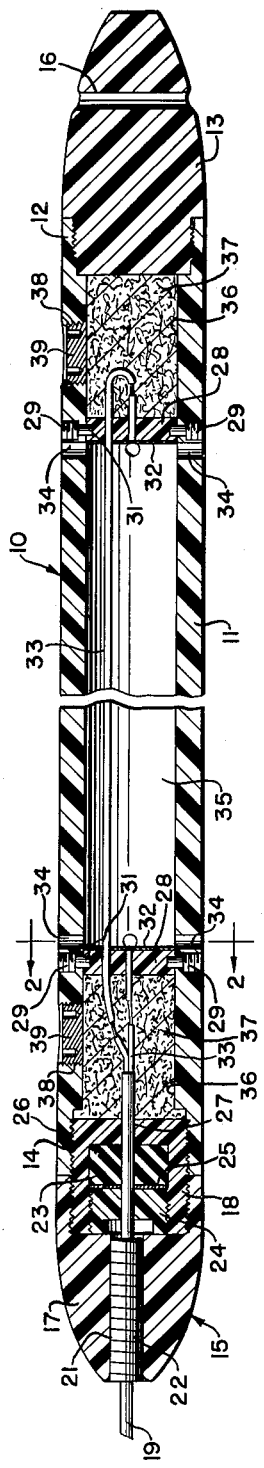
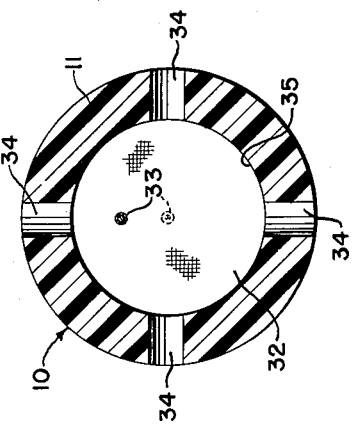
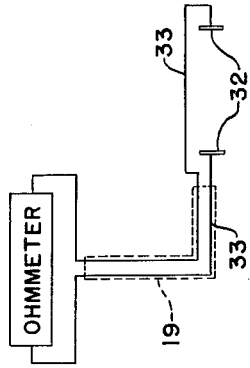
INVENTOR
HARRY V. THOMPSON
BY
*A. D. O'Brien*
*R. M. Hicks*
ATTORNEYS United States Patent Office 2,733,201
Patented Jan. 31, 1956

2,733,201

CONDUCTIVITY CELL FOR DETERMINING THE SALINITY OF SEA WATER

Harry V. Thompson, Rochester, N. Y.

Application July 24, 1952, Serial No. 300,795

1 Claim. (Cl. 204—195)

(Granted under Title 35, U. S. Code (1952), sec. 266)

The invention described herein may be manufactured and used by or for the Government of the United States of America for governmental purposes without the payment of any royalties thereon or therefor.

The present invention relates to apparatus including a conductivity cell for determining the salinity of sea water and which is well suited to rough handling. More particularly the invention relates to such apparatus which is encased in a rugged protective housing for preventing damage to the electrodes of the cell and by which the salinity of a solution is determined by measuring the conductivity or resistivity of the solution to the flow of electrical current.

Prior art conductivity cells have been formed of fragile material which is not suitable for use on shipboard where rough handling is usually encountered. A further objection to prior art devices is that they are used with a conductivity bridge requiring high frequency current, such current being employed to prevent polarization of the electrodes. On many ships high frequency alternating current is not available, thus rendering such apparatus unusable thereon without additional and expensive equipment.

The device of the present invention avoids these difficulties of the prior art by having a rugged casing formed, for example, of a phenolic plastic impregnated linen laminate or other rugged insulating material for protection of the silver, silver chloride electrodes, such electrodes being particularly well suited for use in salt solutions such as sea water. Such electrodes are also sufficiently non-polarizing to permit the use of a conventional ohmmeter to indicate variations in the conductivity of sea water where the ohmmeter requires a current flow of no more than 100 milliamperes.

An object of the present invention is to provide new and improved apparatus for testing the salinity of sea water and which is rugged and well adapted to submersion in the sea.

Another object of the invention is to provide apparatus for measuring the conductivity of sea water and having electrodes of silver, silver chloride enclosed in a protective casing and which have the qualities of long life and efficient service.

Still another object is to provide apparatus for testing the conductivity of sea water which is enclosed in a housing of rugged insulating material and which is non-corrosive in sea water.

Other objects and many of the attendant advantages of this invention will be readily appreciated as the same becomes better understood by reference to the following detailed description when considered in connection with the accompanying drawings wherein:

Fig. 1 is a longitudinal sectional view of the device of the present invention;

Fig. 2 is a sectional view somewhat enlarged and taken along the line 2–2 of Fig. 1;

Fig. 3 is an enlarged fragmentary sectional view through one of the electrodes of the present invention; and Fig. 4 is a schematic diagram of an electrical circuit for use with the device of the present invention.

Referring more particularly to the drawings wherein like numerals indicate like parts throughout the several views, 10 indicates generally a casing formed entirely of linen laminated phenolic resin and comprising an elongated tubular member 11 having threadedly secured at 12 in one end thereof a cap 13 and having threadedly secured at 14 in the other end thereof a cap assembly 15.

Cap 13 has formed therein a transverse bore 16 for receiving a weight, if desired, which will aid in straight streaming of the device in the water. Cap assembly 15 comprises a cap member 17 having a stuffing box 18 threadedly mounted in one end thereof. The box 18 extends outwardly of member 17 and is threaded into member 11 as at 14.

A two-conductor cable 19 passes through an enlarged bore 21 of member 17, the cable being wrapped with rubber tape 22 to fill the space between the cable and the bore. It is clear that in this manner a wide range of sizes of cables may be employed in bore 17. Fitted around cable 19 and threaded into chamber 23 of stuffing box 18 is a packing nut 24, which bears against washer 25 to compress rubber packing 26 against cable 19. Box 18 has a reduced bore 27 through which cable 19 extends into member 11.

A pair of bulkheads 28 are secured within tubular member 11 in spaced adjacency to the ends thereof by means of screws 29 threaded through member 11 and extending into a circumferential groove 31 in each of the bulkheads. Silver, silver chloride electrodes 32 are mounted on the mutually adjacent faces of the bulkheads 28. The electrodes 32 are formed of fine silver gauze of approximately 60 mesh and 6 mil wire and are folded and formed into discs after which the discs are washed and dipped into molten silver chloride. The discs 32 are electrically connected to wires 33 of cable 19 by silver soldering or other suitable means.

A plurality of ports 34 are positioned adjacent each of the electrode discs 32 in the tubular member 11. It will thus be seen that when the device of the present invention is immersed in sea water or other solutions the chamber 35 will be filled by the water or solution entering ports 34. A conductivity cell will thus be set up comprising the electrodes 32 and the sea water or other solution as an electrolyte. A reading of conductivity of the sea water or other solution will depend on the salinity thereof with respect to a given size and shape of electrode, the distance between electrodes, the shape of the chamber and the temperature of the water.

In the present invention the electrodes are spaced rather far apart (approximately 10 inches) for the purpose of reducing to a great extent the error in reading of the cell because of slight changes in resistance of the electrodes over a period of time.

The bulkheads 28 and the end caps 13 and 15 define a pair of chambers 36 at each end of the tubular member 11. These chambers being filled with a suitable filler material 37, the material being for the purpose of excluding water from chambers 36. Member 11 is provided with a threaded opening 38 to permit access to chambers 36, the openings being closed by threaded plugs 39.

It is, of course, understood that a conventional low current ohmmeter as indicated in Fig. 4 or other resistance measuring apparatus is mounted on board ship and is attached to the other end of cable 19 in order to measure the conductivity of the sea water or other saline solution being tested, the reading of conductivity being easily translated to a result indicating the salinity thereof.

Before the device of the present invention is placed in use the cell constant is determined by immersing the device in a measured solution of sodium chloride or potassium chloride and distilled water and measuring the conductivity of the solution on the ohmmeter or other measuring apparatus which requires a current of less than 100 milliamperes. An example of a potassium chloride solution for use in determining the cell constant is as follows: 76.6 gm. potassium chloride per 1000 gm. distilled water. This solution has a resistivity of 8.984 ohms per centimeter cube at 25° C. and 8.250 ohms per centimeter cube at 30° C. After the constant has been determined the apparatus is ready for use in sea water where it is desired to ascertain variations of salinity thereof.

The formula for determining the cell constant electrochemically is as follows:

$$R_s = K(R_m - r)$$

$R_s$ = specific resistance or resistivity of the salt solution
$K$ = cell constant
$R_m$ = resistance in ohms
$r$ = lead wire resistance in ohms In ordinary practice, to prevent excessive reduction of one electrode with an accompanying change in resistance thereof and to ensure greater accuracy in measuring, two readings are taken, the second reading being taken with the terminal connections reversed with respect to the first reading, and the two readings are averaged.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

Apparatus for providing intelligence indicative of the conductivity of solutions having variable salinity comprising, an elongated tubular casing of electrical insulating material having internal threads on both ends thereof, a pair of streamlined closure elements threadedly mounted on opposite ends of said tubular casing, one of said closure elements having a longitudinal bore therethrough for reception of an electrical cable, an electrical cable passing through said longitudinal bore, the other of said closure elements having a transverse bore therethrough and adapted for reception of weights therein and disposed to assist in stabilization of the device as the same is towed through a body of water, a packing gland disposed internally of said longitudinal bore in said one of said closure elements and in axial alignment therewith for providing a seal for said electrical cable with respect to the interior of said casing, a pair of insulating bulkheads disposed within said casing, each in spaced relation with a respective one of said pair of closure elements and at the respective interior ends thereof, said bulkheads and closure elements forming a pair of chambers at the end portions of said casing, a pair of disc shaped depolarizing electrodes of 60 mesh, 6 mil. silver wire and coated with silver chloride fixedly mounted on said bulkheads, said electrodes being mounted on the mutually adjacent side of said bulkheads, said tubular member being provided with a plurality of transverse ports therethrough disposed in immediate adjacency to said electrodes for permitting entry of a saline solution only between said electrodes, said electrical cable including a pair of electrical conductors, one of each of said pair of conductors being connected to a different one of said electrodes, a packing material disposed in each of said chambers for supporting said conductors and maintaining an exclusion of solution from said chambers, thereby preventing electrical leakage therebetween, said casing having openings for access to said chambers, and closure members for said openings.

References Cited in the file of this patent

UNITED STATES PATENTS

| | | |
|---|---|---|
| 1,472,125 | Keeler | Oct. 30, 1923 |
| 1,474,151 | Keeler | Nov. 13, 1923 |
| 1,807,821 | Behr | June 2, 1931 |
| 2,229,036 | Bird et al. | Jan. 21, 1941 |
| 2,238,903 | Lieneweg | Apr. 22, 1941 |
| 2,454,952 | Starkey | Nov. 30, 1948 |
| 2,513,388 | Williams | July 4, 1950 |

FOREIGN PATENTS

| | | |
|---|---|---|
| 123,936 | Great Britain | Mar. 13, 1919 |
| 595,475 | Great Britain | Dec. 5, 1947 |
| 301,176 | Germany | Oct. 11, 1917 |
| 334,607 | France | Dec. 28, 1903 |